United States Patent Office 3,706,742
Patented Dec. 19, 1972

3,706,742
TETRAHYDROQUINOXALINE/ALDEHYDE REACTION PRODUCTS AS ANTIOXONANTS
Farris H. Wilson, Jr., Cuyahoga Falls, Ohio, assignor to The Goodyear Tire & Rubber Company, Akron, Ohio
No Drawing. Original application Mar. 29, 1968, Ser. No. 717,463, now Patent No. 3,580,884. Divided and this application Aug. 17, 1970, Ser. No. 64,640
Int. Cl. C07d 51/78
U.S. Cl. 260—250 R     5 Claims

ABSTRACT OF THE DISCLOSURE

Polymers protected against ozone degradation by the incorporation of a reaction product produced by reacting a tetrahydroquinoxaline (1,2,3,4-tetrahydroquinoxaline) with an aldehyde (formaldehyde).

---

This is a division of application Ser. No. 717,463, filed Mar. 29, 1968, now Pat. No. 3,580,884.

This invention relates to the preservation of polymers and more particularly to the preservation of polymers by the incorporation therein of a stabilizing amount of a reaction product of a tetrahydroquinoxaline and an aldehyde.

Unsaturated polymers, whether natural or synthetic vulcanized or unvulcanized, are normally susceptible to degradation by ozone. By and large this occurs as a result of prolonged exposure to ozone contained in the atmosphere. Ozone degradation can manifest itself in rubber by the scission of polymer chains, thereby resulting in a decrease in tensile strength, flexibility and other desirable properties. Therefore it is often necessary to provide compounds which will, by incorporation into the polymers, protect the polymers against ozone degradation.

It is an object of this invention to provide novel compounds which can be used as antiozonants for polymers and provide stabilized polymers having said compounds incorporated therein.

In accordance with the present invention it has been discovered that polymers may be protected against the deleterious effects of ozone by incorporating therein a reaction product prepared by reacting aldehydes with tetrahydroquinoxalines.

The aldehydes that may be employed in preparing the reaction products of this invention are compounds conforming to the following structural formula:

wherein R is selected from the group consisting of hydrogen, alkyl radicals having from 1 to 20 carbon atoms, cycloalkyl radicals having from 5 to 10 carbon atoms, heterocyclic radicals having from 4 to 10 carbon atoms and 1 to 4 additional atoms selected from the group consisting of sulfur, nitrogen and oxygen, aryl radicals having from 6 to 8 carbon atoms and aralkyl radicals having from 7 to 12 carbon atoms. Among the more preferred aldehydes that may be employed are formaldehyde, acetaldehyde, propionaldehyde, benzaldehyde, furfural, tetrahydrofurfural and butyraldehyde. The most preferred aldehyde is formaldehyde.

The tetrahydroquinoxalines that are to be employed in preparing the reaction products of this invention are compounds that conform to the following structural formula:

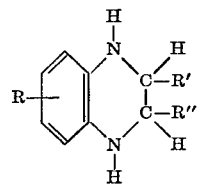

wherein R is selected from the group consisting of hydrogen, alkyl radicals having from 1 to 12 carbon atoms, alkoxy radicals having from 1 to 12 carbon atoms, cycloalkyl radicals having from 5 to 12 carbon atoms, cycloalkoxy radicals having from 5 to 12 carbon atoms, aryl radicals having from 6 to 10 carbon atoms, aralkyl radicals having from 7 to 12 carbon atoms, alkaryl radicals having from 7 to 12 carbon atoms, aryloxy radicals having from 6 to 10 carbon atoms and heterocyclic radicals having from 4 to 10 carbon atoms and 1 to 4 additional atoms selected from the group consisting of sulfur, nitrogen and oxygen, and wherein R' and R" are selected from the group consisting of hydrogen, alkyl radicals having from 1 to 12 carbon atoms, aryl radicals having from 6 to 10 carbon atoms, cycloalkyl radicals having from 5 to 10 carbon atoms and radicals wherein the R' and R" are joined together to form a carbocyclic ring having from 5 to 10 carbon atoms. Among the preferred R radicals in compounds conforming to the above structural formula are methyl, ethyl, propyl, butyl, isopropyl, isobutyl, tertiary butyl, secondary butyl, pentyl, methoxy, ethoxy, propoxy, butoxy, pentoxy, cyclohexl, phenyl and phenoxy. Among the preferred R' radicals of compounds in accordance with the above structural formula are methyl, ethyl, propyl, butyl, pentyl, cyclohexyl, methylcyclohexyl, phenyl, tolyl, xylyl and cyclopentyl. Within this foregoing definition the most preferred tetrahydroquinoxalines includes 1,2,3,4-tetrahydroquinoxaline; and 2,3-dimethyl-1,2,3,4-tetrahydroquinoxaline.

The unique reaction products of this invention are prepared by reacting the tetrahydroquinoxalines with an aldehyde in an aqueous solution and in the presence of an acidic catalyst. Preferably one to three mols of at least one tetrahydroquinoxaline are combined with one mol of at least one aldehyde. A particularly preferred combination comprises approximately two mols of the tetrahydroquinoxaline and one mol of the aldehyde. The combination is permitted to react for an extended period of time at a temperature of —20° C. to 200° C. A preferred temperature range is 0° C. to 120° C. The reaction mixture is then cooled and the acidic catalyst neutralized by pouring it into an aqueous alkaline solution where it is vigorously agitated. The desired reaction product is then separated by filtration and thoroughly washed with water and subsequently dried. The desired reaction products have melting points in the range between 65 and 150° C. They are produced in good yield by the above described procedures and yields in the range of 90 percent of theoretical are routinely obtained.

The acidic catalyst that may be employed to catalyze the reaction employed to produce reaction products of aldehydes and tetrahydroquinoxalines include hydrochloric acid, sulfuric acid, hydrogen bromide, toluene sulfonic acid and phosphoric acid.

The following examples illustrate the preparation of the reaction products that are useful in stabilizing polymers in accordance with the present invention, but they are not to be interpreted as limitations of the scope of the invention.

EXAMPLE 1

Into a flask equipped with stirrer, thermometer, dropping funnel and reflux condenser were charged 20 grams of 2,3-dimethyl-1,2,3,4-tetrahydroquinoxaline, 40 milliliters of concentrated hydrochloric acid and 40 milliliters of water. These materials were heated to 100° C. to obtain a solution and then cooled to 11° C., with stirring in order to obtain a uniform suspension. To this cooled reaction mixture was then added 5.5 grams of formalin (an aqueous solution containing 37 percent formaldehyde) during a 35 minute interval. The reaction mixture was stirred for one hour at 15 to 25° C. and then gradually heated to 100° C. and maintained at this temperature for approximately 24 hours. The reaction mixture was cooled to 70° C. and poured into an aqueous alkaline solution containing 21 grams of sodium hydroxide. The system was stirred vigorously for 30 minutes. The solid reaction product was then separated by filtration and the filter cake washed with water and dried. The weight of product recovered was 19.5 grams, representing a yield of 94 percent. The melting point ranged from 75 to 124° C.

EXAMPLE 2

Into a reaction flask equipped as in Example 1 was charged 20 grams of 2,3-dimethyl-1,2,3,4-tetrahydroquinoxaline, 40 milliliters of concentrated hydrochloric acid and 40 milliliters of water. The reaction mixture was heated to 95° C. to obtain solution and then cooled to 8° C. with continuous stirring to obtain a uniform slurry. To this cooled reaction mixture was introduced 5.5 grams of formalin over a 15 minute interval. The reaction mixture was then stirred for approximately one hour, maintaining the temperature at 10 to 13° C. The cooling bath was removed and stirring of the reactants continued for approximately 24 hours at room temperature. The reactants were then poured into an aqueous solution containing 21 grams of sodium hydroxide and subjected to vigorous stirring for approximately 30 minutes. The solid reaction product was then separated by filtration, the filter cake was washed several times with water and then dried. The melting point of the product obtained was 75 to 124° C.

EXAMPLE 3

Into a reaction flask equipped as described in Example 1 was charged 20 grams of 1,2,3,4-tetrahydroquinoxaline, 30 grams of concentrated sulfuric acid and 100 milliliters of water. This reaction mixture was cooled to 8° C. and 6 grams of formalin added over an interval of 15 minutes. The reactants were then stirred for one hour at 10 to 22° C. and then gradually heated to reflux temperature and maintained at reflux for an additional 22 hours while being subjected to continuous stirring. The reaction mixture was then cooled to 65° C. and poured into an aqueous alkaline solution containnig 25 grams of sodium hydroxide, which was subjected to vigorous stirring for approximately 30 minutes. The solid reaction product was separated by filtration and the filter cake washed several times with water and then dried. The dried reaction product weighed 18.5 grams, representing a yield of 88.5 percent. The melting point of the reaction product was 80 to 125° C.

EXAMPLE 4

Into a reaction flask equipped as described in Example 1 was charged 20 grams of 2,3-dimethyl-1,2,3,4-tetrahydroquinoxaline, 26 grams of concentrated sulfuric acid and 85 milliliters of water. The reaction mixture was heated to 55° C. with stirring to obtain solution and then cooled to 7.5° C. To this cooled reaction mixture was gradually introduced 5.5 grams of formalin added over an interval of 15 minutes. The reactants were stirred for one hour at a temperature between 11 to 22° C. and then gradually heated to reflux and stirred for an additional 24 hours. The reaction mixture was then cooled to 70° C. and poured into an aqueous alkaline solution containing 24 grams of sodium hydroxide. The slurry was vigorously stirred for approximately 30 minutes. The solid reaction product was then filtered and washed several times with water and dried. The resulting reaction product weighed 18 grams, representing a yield of 85 percent. The melting point of the resulting reaction product was 65 to 105° C.

EXAMPLE 5

Into a flask equipped as described in Example 1 was charged 20 grams of 2,3-dimethyl-1,2,3,4-tetrahydroquinoxaline, 40 milliliters of concentrated hydrochloric acid and 40 milliliters of water. These reactants were then heated to 100° C. and stirred to obtain solution and then cooled to 9° C. while stirring to obtain a uniform slurry. To the cooled reaction mixture was gradually introduced 2.7 grams of acetaldehyde over a 30 minute interval. The reactants were stirred for one hour at 10 to 22.5° C. and then heated gradually to 101° C. and permitted to react for six hours. The reaction mixture was then cooled to 50° C. and poured into an aqueous alkaline solution containing 21 grams of sodium hydroxide. The resulting combination was vigorously stirred for approximately 30 minutes. The solid reaction product was filtered and washed with water and then dried. The resulting product weighed 16.5 grams, representing a yield of 76.4 percent. The resultant reaction product had a melting point of 75 to 105° C.

The reaction products prepared in accordance with the present invention are effective in stabilizing polymers against ozone attack. The precise amount of these highly effective reaction products which is to be employed will depend somewhat upon the nature of the polymer and the severity of deteriorating conditions to which the polymer is to be exposed. It has been found that an effective antiozonant amount of the disclosed reaction products will generally range from 0.5 to 5 percent by weight based on the weight of the polymer although it is generally preferred to use from 1 to 4 percent by weight based on the weight of the polymer. The effective proportions may also be defined as ranging from approximately 0.25 to 10 parts by weight per 100 parts by weight of polymer.

The polymers that may be conveniently protected by the compounds of this invention in accordance with this invention are vulcanized and unvulcanized polymers susceptible to ozone degradation, such as natural rubber and synthetic polymers containing carbon to carbon double bonds. Representative examples of the synthetic polymers used in the practice of this invention are polychloroprene; homopolymers of a conjugated 1,3-diene such as isoprene and butadiene and in particular, polyisoprenes and polybutadienes having essentially all of their segmeric units combined in a cis-1,4 structure; copolymers of a conjugated 1,3-diene such as isoprene and butadiene with up to 50 percent by weight of at least one copolymerizable monomer such as styrene and acrylonitrile; butyl rubber, which is a polymerization product of a major proportion of a mono olefin and a minor proportion of a multi olefin such as butadiene or isoprene; copolymers of mono olefins containing unsaturation, i.e., carbon to carbon double bonds, such as terpolymers of ethylene, propylene and a nonconjugated diene and polyurethanes containing carbon to carbon double bonds.

The practice of this invention is found particularly beneficial when applied to the stabilization of natural rubber and synthetic homopolymers of a conjugated 1,3-diene such as isoprene and butadiene and copolymers of said diene with up to 50 percent by weight of at least one copolymerizable monomer such as styrene and acrylonitrile. The practice of this invention is found most beneficial when applied to the stabilization of copolymers of butadiene and styrene.

The reaction products of this invention are useful in protecting polymers against ozone degradation whether the polymer is vulcanized or unvulcanized. The manner of adding the products to the polymers is not normally critical. The products may be added to the polymer while the polymer is in latex or emulsion form, suspension form, dispersion form or solution form. They may also be added to dry polymer using any of the conventional dry mixing means such as an open mill, an extruder or an internal mixer such as a Banbury mixer. The form in which the inhibitors are added to the polymer will depend on such factors as the solubility of the inhibitors and whether they are liquids or solids. Generally they may be added directly or in the form of emulsions, suspensions or solutions.

The ability of the reaction products prepared in accordance with the present invention to protect polymers against ozone degradation was evaluated by conducting dilute solution viscosity (DSV) tests using natural rubber (pale crepe) as the base rubber in which to evaluate the various inhibitors. In this test the retention of viscosity of a solvent solution of the rubber upon exposure to a mixture of oxygen and ozone which is bubbled through the solution is taken as a measure of anti-ozonant efficiency. The DSV tests were carried out in accordance with the general procedure outlined in the article by Delman, Simms & Allison (Analytical Chemistry, volume 26, pages 1589–1592—1954). Essentially this procedure comprises preparing a masterbatch solution of 0.8 gram of the base rubber in 100 milliliters of an organic solvent such as carbon tetrachloride, dichlorobenzene, toluene, etc. Portions of the masterbatch solution are then diluted with additional solvent to obtain solutions containing 0.2 gram of rubber per 100 milliliters of solution. The inhibitors to be evaluated for antiozonant efficiency are introduced to separate portions of the above described dilute solution in the amount of 4 parts per 100 parts of rubber. A stream of oxygen containing ozone is then passed through the dilute solutions and their viscosity determined at selected intervals using a Cannon-Fenski-Ostwald type viscometer.

The antiozonant efficiency of the inhibitors is calculated by employing the following equation:

$$\text{Antiozonant efficiency percent} = \frac{100(B-A)}{(C-A)}$$

where

A = DSV of additive free control after ozonolysis
B = DSV of additive containing solution after ozonolysis
C = initial DSV of additive free control before ozonolysis Results are then converted to a common basis (to allow for sporadic variations in crepe rubber compositions or in experimental conditions) by relating the antiozonant efficiency of an inhibitor to that of a standard inhibitor. Employing the above described dilute solution viscosity test to materials prepared in Examples 1 through 5 as described above and to a well known commercially available stabilizer (a mixture of diaryl-p-phenylenediamines), the following values were obtained as shown in Table I. The performance of the commercial stabilizer was evaluated in each of the solvents listed in Table I, and its performance assigned an AOE value of 100. The activity was determined in different solvents since some of the products were more soluble in some solvents than others.

TABLE I

| Antiozonant | Antiozonant efficiency (AOE) | Solvent |
|---|---|---|
| Product of Example: | | |
| 1 | 202 | Carbon tetrachloride. |
| 2 | 187.5 | Do. |
| 3 | 165 | Orthodichlorobenzene. |
| 4 | 229.5 | Toluene. |
| 5 | 216 | Do. |

The effectiveness of the stabilizers of this invention is further demonstrated by subjecting rubber samples containing them to accelerated aging in an ozone chamber and comparing the relative deterioration of the sample compared to the deterioration shown in a similar sample containing a commercially available stabilizer. The polymer in which these tests were conducted was a typical SBR rubber conventionally referred to as 1502 black stock prepared by a cold polymerization procedure and containing approximately 75 percent bound butadiene and 25 percent bound styrene. This rubber stock was formulated in the following manner:

| Ingredients: | Parts by weight proportion |
|---|---|
| Cold SBR (1502) | 100.00 |
| High abrasion furnace black | 50.00 |
| Stearic acid | 2.00 |
| Hydrocarbon processing oil | 5.00 |
| Zinc oxide | 3.00 |
| Benzothiazole disulfide | 1.00 |
| Sulfur | 1.75 |
| Diphenyl guanidine | 0.2 |

Sheets of the above rubber formulation were cured for 60 minutes at 285° C. (140° C.). Dumbbells of 2" x .075" x .075" with ¼" square ends were cut from the sheets. These dumbbells were immersed in benzene solutions containing an antiozonant concentration sufficient to give 4 phr. of antiozonant in the dumbbell when it was completely swollen. The dumbbells were removed from solution, allowed to dry 3 hours in a hood and then were dried for 3 hours in a vacuum oven at 26"mercury vacuum at 46 to 48° C. Samples of each antiozonant were tested three ways: First—without prior stretching (unaged); second—aged at 20 percent elongation for 24 hours at room temperature and third—aged at 20 percent elongation for one hour at 100° C.

These dumbbells were tested at 20 percent elongation in an ozone chamber continuously charged with air containing 50 p.p.h.m. $O_3$. The temperature was maintained at 100° F. The time, in hours, required for the first visible crack to develop in the test samples is summarized in Table II below.

TABLE II

| | Hours to first cracking | | |
|---|---|---|---|
| Stabilizer | Unaged | Aged 24 hours at room temp. | Aged one hour at 100° C. |
| Control (a commercially available mixture of diaryl-p-phenylenediamine) | 7 | 24 | 7 |
| Product of Example 4 | 336 | 412 | 216 |

A consideration of the data presented in the foregoing tables will clearly demonstrate that the reaction products prepared by reacting aldehydes with tetrahydroquinoxalines in accordance with the present invention are highly effective stabilizers for rubber.

In addition to the other tetrahydroquinoxaline reactants herein, the following exemplary 1,2,3,4-tetrahydroquinoxalines may be employed as reactants in the preparation of the antiozonants of the present invention:

5-butyl-2,3-diethyl-1,2,3,4-terahydroquinoxaline
2,3-dibutyl-1,2,3,4-tetrahydroquinoxaline
5-methoxy-1,2,3,4-tetrahydroquinoxaline
6-cyclohexyl-2-amyl-1,2,3,4-tetrahydroquinoxaline
7-cyclohexoxy-3-butyl-1,2,3,4-tetrahydroquinoxaline
5-phenyl-1,2,3,4-tetrahydroquinoxaline
5-α-phenylethyl-2-cyclohexyl-1,2,3,4-tetrahydroquinoxaline
5-(4-methylphenyl)-1,2,3,4-tetrahydroquinoxaline
6-phenoxy-1,2,3,4-tetrahydroquinoxaline
6-morpholino-2,3-dimethyl-1,2,3,4-tetrahydroquinoxaline
2-phenyl-1,2,3,4-tetrahydroquinoxaline While certain representative embodiments and details have been shown for the purpose of illustrating the invention, it will be apparent to those skilled in this art that various changes and modifications may be made therein

What is claimed is:

1. A reaction product prepared by reacting a mixture comprising (1) one mol of at least one aldehyde having the following structural formula:

wherein R is selected from the group consisting of hydrogen, alkyl radicals having from 1 to 20 carbon atoms, cycloalkyl radicals having from 5 to 10 carbon atoms, heterocyclic radicals having from 4 to 10 carbon atoms and 1 to 4 additional atoms selected from the group consisting of sulfur, nitrogen and oxygen, aryl radicals having from 6 to 8 carbon atoms and aralkyl radicals having from 7 to 12 carbon atoms and (2) one to three mols of at least one tetrahydroquinoxaline having the structural formula

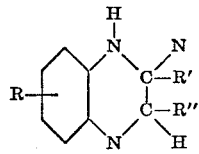

wherein R is selected from the group consisting of hydrogen, alkyl radicals having from 1 to 12 carbon atoms, alkoxy radicals having from 1 to 12 carbon atoms, cycloalkyl radicals having from 5 to 12 carbon atoms, and cycloalkoxy radicals having from 5 to 12 carbon atoms, aryl radicals having from 6 to 10 carbon atoms, aralkyl radicals having from 7 to 12 carbon atoms, alkaryl radicals having from 7 to 12 carbon atoms, aryloxy radicals having from 6 to 10 carbon atoms and heterocyclic radicals having from 4 to 10 carbon atoms and 1 to 4 additional atoms selected from the group consisting of sulfur, nitrogen and oxygen wherein R' and R" are selected from the group consisting of hydrogen, alkyl radicals having from 1 to 12 carbon atoms, aryl radicals having from 6 to 10 carbon atoms, cycloalkyl radicals having from 5 to 10 carbon atoms and radicals wherein R' and R" are joined together to form a carbocyclic ring having from 5 to 10 carbon atoms, said reactants being reacted in the presence of an acidic catalyst.

2. The reaction product according to claim 1 wherein the aldehyde is selected from the group consisting of formaldehyde, acetaldehyde, propionaldehyde, benzaldehyde, furfural, tetrahydrofurfural and butyraldehyde wherein the tetrahydroquinoxaline is selected from the group consisting of 1,2,3,4-tetrahydroquinoxaline and 2,3-dimethyl-1,2,3,4-tetrahydroquinoxaline and wherein the reactants are reacted in the presence of an acidic catalyst at a temperature of −20° C. to 200° C.

3. A reaction product prepared by reacting a mixture comprising (1) approximately two mols of 1,2,3,4-tetrahydroquinoxaline and approximately one mole of formaldehyde, said reaction being conducted in the presence of an acidic catalyst at a temperature of 0° C. to 120° C.

4. A reaction product prepared by reacting a mixture comprising (1) approximately two mols of 2,3-dimethyl-1,2,3,4-tetrahydroquinoxaline and approximately one mole of formaldehyde, said reaction being conducted in the presence of an acidic catalyst at a temperature of 0° C. 120° C.

5. The reaction product according to claim 1 wherein the acidic catalyst is selected from the group consisting of hydrochloric acid, sulfuric acid, hydrogen bromide, toluene sulfonic acid and phosphoric acid.

References Cited

UNITED STATES PATENTS 3,291,757  12/1966  Sturm _____ 260—250 R
3,580,884  5/1971   Wilson _____ 260—250 R NICHOLAS S. RIZZO, Primary Examiner